Sept. 26, 1961   J. A. ANDERSON   3,001,577
AWNING
Filed Oct. 13, 1958   3 Sheets-Sheet 1
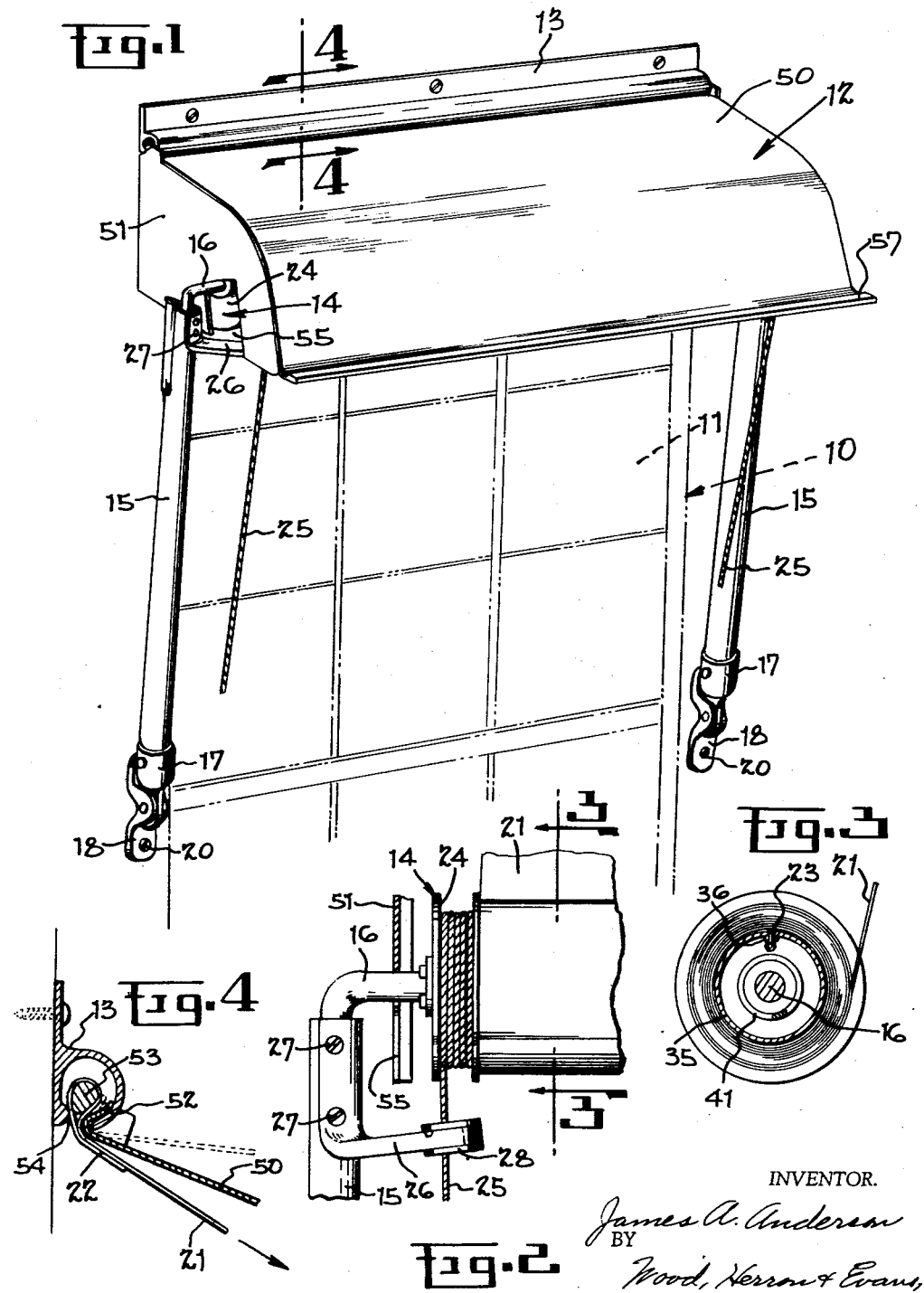
INVENTOR.
James A. Anderson
BY
Wood, Herron & Evans,
ATTORNEYS.

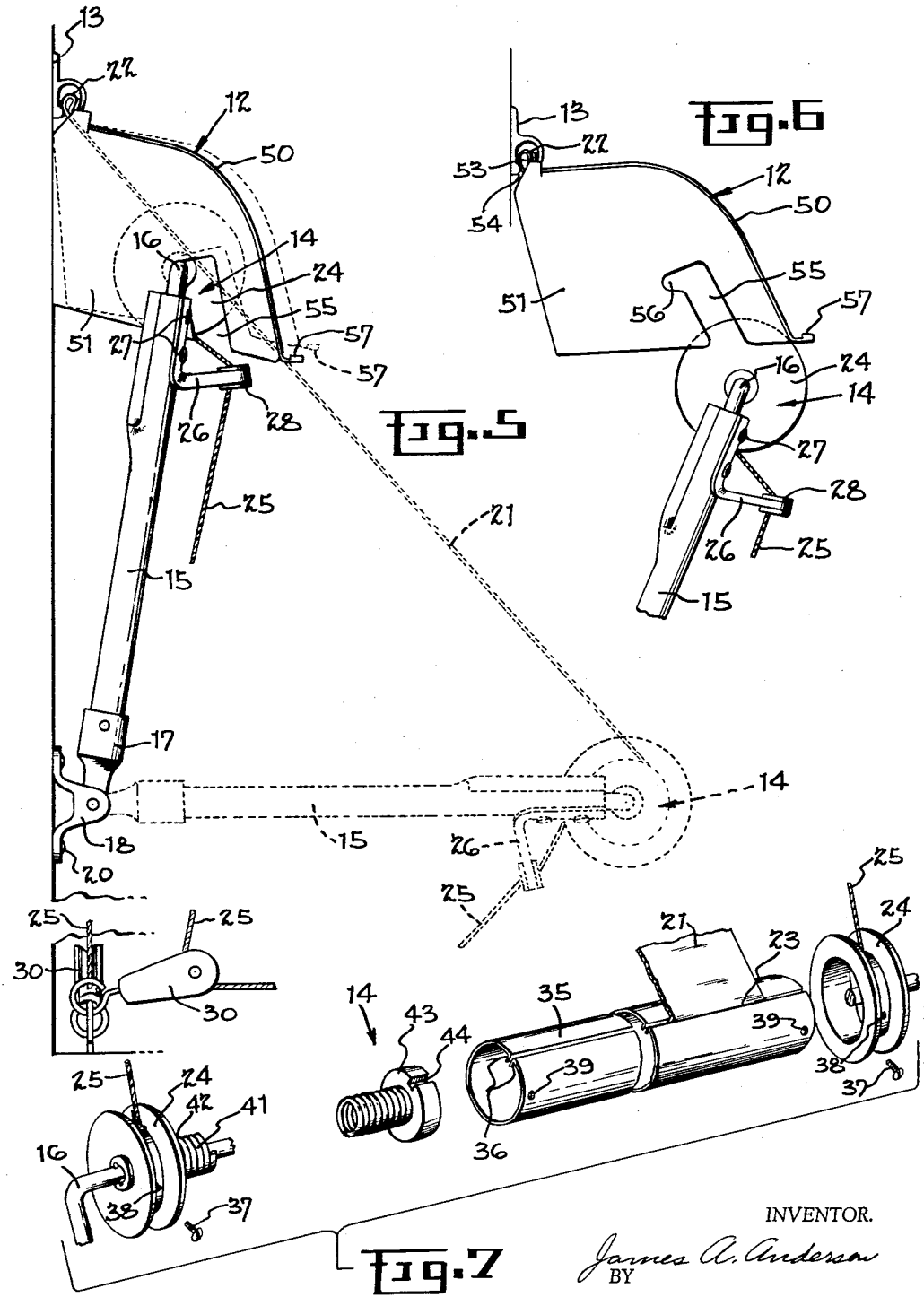

Sept. 26, 1961  J. A. ANDERSON  3,001,577
AWNING
Filed Oct. 13, 1958  3 Sheets-Sheet 3
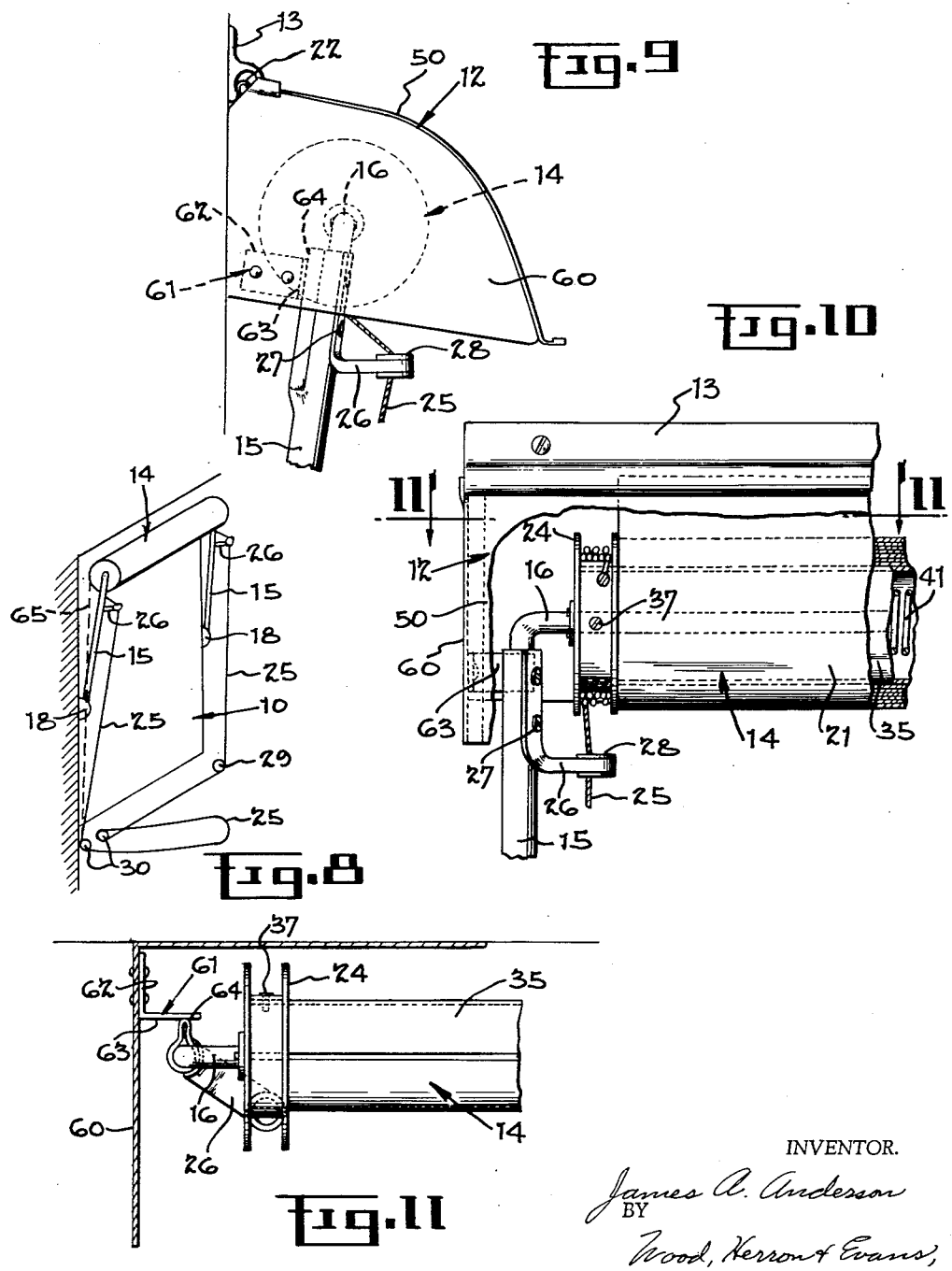
INVENTOR.
James A. Anderson
BY
Wood, Herron & Evans,
ATTORNEYS.

United States Patent Office 3,001,577
Patented Sept. 26, 1961

3,001,577
AWNING

James A. Anderson, Muskegon, Mich., assignor to Breneman-Hartshorn, Inc., Cincinnati, Ohio, a corporation of Ohio
Filed Oct. 13, 1958, Ser. No. 766,795
11 Claims. (Cl. 160—29)

This invention relates to a window awning and more particularly to an awning of the type having an awning sheet fixed at one end to a window frame and at the other end to arms pivoted to the window frame, and having a canopy designed to receive the awning sheet when it is in its raised, storage position.

It has been an objective of the invention to provide an awning in which the awning sheet is attached to a torsion spring biased roller, the roller being mounted between the ends of a pair of arms pivoted to a window frame. The arms are swingable up and down to raise and lower the awning, the torsion spring roller performing the dual function of urging the awning to a raised position and winding the awning sheet onto the roller when the awning is raised. By mounting the roller and awning sheet at the ends of the pivoted arms, the combined weight of the roller and the awning sheet material on the ends of the arms tends to counterbalance the force of the torsion wind up spring so that an awning may be conveniently raised and lowered against the action of a torsion spring. Further, the added weight on the awning arms tends to increase the stability of the awning when extended and reduces the rattling and flapping normally caused by wind.

Another objective of the invention has been to provide spools fixed to the ends of the rollers, the spools having pull cords wound thereon by which the awning is to be raised and lowered. Proper awning design requires the awning sheet to be wound on the roller over the top and down under the roller. This manner of winding the awning sheet onto the roller determines the direction that a pull cord must be wound on the spools associated with the awning, namely, that the cord must come off the spool on the side of the spool adjacent the window frame. This positioning of the cord presents a poor leverage condition and normally would make quite difficult the lowering of the awning by pulling on the cord. It has been yet another objective of the invention to obviate this difficulty by fixing to the awning arms, a bracket having a guide member projected out from the arms to improve the leverage condition of the pull cord on the awning. The guide serves the dual purpose of guiding the cord directly onto the spool when the awning is raised thereby avoiding the snarling of the cord around the awning arms.

It has been still another objective of the invention to utilize the bracket design in the combination described above thereby permitting pull cord pulleys to be positioned immediately adjacent the window frame and beneath the pivotal mounting of the arms a distance approximately equal to the length of the arms whereby the awning may be drawn completely over the window. In the absence of the bracket design, it would be necessary to position the pulleys out from the frame of the window in order to apply the force from the cord to the upper ends of the arms in such a direction to permit the awning to be lowered. If the pulleys were positioned out from the window frame it would then be impossible to close the awning completely over the window opening.

It has been still another objective of the invention to provide a hinged canopy to cover the awning and roller when in raised position and to provide a combined canopy hinge and awning sheet attachment. The hinge includes a C-shaped extrusion fixed to the window frame and a flange on the canopy projecting into the extrusion. One end of the awning sheet is provided with a rod-like member, for example a cord extending across the end of the awning sheet, the rod-like member being lodged in the extrusion alongside the canopy projection. The tension imparted to the awning sheet by the torsion spring biased roller pulls the thus enlarged end of the awning sheet against the canopy projection thereby forcing the canopy projection to fit snugly against the extrusion. Through this design, the canopy hinge is simple to construct and secure against undesirable movement such as rattling or falling out of the extrusion.

It has been still another objective of the invention to assure the absence of rattling of the canopy by providing means for effecting engagement of the arms and roller assembly with the canopy when the arms and roller assembly is in raised position. In one form of this invention the canopy is provided with notched or slotted side walls through which the arms of the awning pass when the awning is raised, the arms bearing against the edges of the slot under the tension of the torsion spring urging the arms to their uppermost position whereby the canopy is forced firmly against the window frame. In a second form of the invention the upper portion of the arms resides wholly within the canopy and bears against an abutment provided inside the canopy for that purpose.

These and other objectives of the invention will become more readily apparent from the following detailed description taken in conjunction with the accompanying drawings in which:

FIG. 1 is a perspective view of the invention;
FIG. 2 is a fragmentary front elevational view thereof;
FIG. 3 is a cross-sectional view taken along line 3—3 of FIG. 2;
FIG. 4 is a cross-sectional view taken along line 4—4 of FIG. 1;
FIG. 5 is a side elevational view of the invention;
FIG. 6 is a fragmentary side elevational view thereof;
FIG. 7 is a disassembled perspective view of the roller construction;
FIG. 8 is a diagrammatic view of the invention;
FIG. 9 is a fragmentary side elevational view of an alternative form of the invention;
FIG. 10 is a fragmentary front elevational view thereof; and
FIG. 11 is a cross-sectional view taken along line 11—11 of Fig. 10.

The present invention is designed to be mounted on a window frame of the type indicated at 10 enclosing a window opening 11 shown in the broken lines. A canopy 12 is hinged at the top of the frame on a fixed hinge member 13 to enclose an awning roller 14 rotatably mounted on arms 15. The arms are L-shaped having inward projections 16 at one end thereof and having a pivot hinge 17 cooperating with a fixed hinge member 18 at the other end thereof. The hinge member 18 is fixed to the frame in a suitable manner as by screws indicated at 20.

As illustrated in FIGS. 5 and 7 an awning sheet 21 is fixed at one end 22 to the hinge member 13 while the other end is fixed to the roller as at 23 so that the awning may be wound about the roller. The roller is equipped at each end thereof with spools 24 about which pull cords 25 are wound. The pull cords pass through a guide bracket 26 fixed by screws 27 to the arms 15, a nylon eye 28 being provided as a friction reducing surface over which the cord will pass. The cords pass through pulleys 29 and 30 disposed directly below the pivot hinge member 18 and spaced therefrom a distance approximately equal to the length of the arms 15. In practice one pulley 29 will be disposed below one of the arms and two pulleys 30 below the other of the arms, the second pulley 30 receiving the cord as it passes over horizontally from the pulley 29.

Roller construction

FIG. 7 illustrates the manner in which the awning roller 14 is constructed. The roller includes a tubular member 35 fabricated from sheet metal and leaving spaced inturned edges 36 through which the end of the awning passes to be clamped therebetween. The tubular member 35 telescopes within the pulleys 24 and is secured thereto by screws 37 passing through holes 38 in the pulley and holes 39 in the tube. A torsion spring 41 is fixed at one end 42 to the inwardly directed projection 16 of the awning arms. The other end of the torsion spring is fixed to a collar 43 having a keyway 44 which receives the inturned edges 36 of the tubular member 35 and thus is prevented from rotating with respect to the tubular member. During the installation of the awning an initial tension is applied to the torsion spring so that a spring force will be applied to the awning to hold it in its uppermost position as shown in FIGS. 1 and 5.

The torsion spring 41 is designed to be placed under greatest tension when the arms are pivoted to their lowermost position and the awning sheet is substantially unwound from the roller. The tension imparted by the spring to the tubular member and spools normally urges the roller to its uppermost position as shown in full lines in FIG. 5 in which the roller is completely housed within the canopy 12.

Canopy construction

The canopy includes an outwardly and downwardly directed sheet metal member 50 terminated at its lateral edges by side walls 51. The side walls are fastened to the sheet 50 either by screws, welding or other suitable means.

Each canopy side wall 51 is provided with a slot 55 terminating at its inner end at a notch 56 (FIG. 6). The slots 55 are in the path of the respective arm projections 16 as they move up and down in accordance with the desired position of the awning. When the awning roller 14 is raised, the arm projection 16 moves through the slot 55 and bears against the slot edge formed by the notch 56 to retain the canopy tightly in a position against the window frame as illustrated in full line in FIG. 5. The lower edge of notch 56 is substantially perpendicular to the length of arms 15 so that any tendency of the wind to lift the canopy is firmly resisted by the lower edge of notch 56 bearing against projections 16. The projections 16 are further held firmly in the notches 56 by the action of the torsion spring on the awning sheet which places the awning sheet under tension.

As best illustrated in FIG. 4 the upper edge of the sheet 50 is formed as an outwardly and upwardly directed projection or flange 52 lodged within the C-shaped fixed hinge member 13. The projection 52 is firmly and snugly seated within the fixed hinge member 13 by a rod-like length of cord 53 secured to the end 22 of the awning sheet 21. The projection 52 and enlarged end of the awning sheet 22 cooperate with each other by mutually preventing escape from the opening 54 of the C-shaped fixed hinge member. The snug hinge design is augmented by the tension imparted in the direction of the arrow of FIG. 4 to the awning sheet by the torsion spring 41. The effect of the enlarged end 22 of the awning sheet pulling against the canopy projection 52 is to secure the projection not only against its inadvertent removal from the fixed hinge member 13 but also against rattling caused by wind.

Another feature of the hinge design is best illustrated in FIG. 4 wherein it can be seen that the manner of shaping C-shaped the hinge member 13 combined with position of the projection 52 with respect to the hinge member prevents the passage of water through the hinge onto the awning sheet.

The importance of the hinging of the canopy can best be appreciated by referring to FIGS. 5 and 6. In order to eliminate, insofar as possible, the exposing of the awning sheet to the elements when it is in its storage or raised position, it is advisable to have the sheet 50 fit down over the awning roller to enclose the awning roller as completely as possible. The complete enclosure of the awning can be attained only if the canopy is hinged so as to permit the awning roller to pass to and from its position within the canopy. The amount of swinging movement required to permit the passage of the roller is illustrated by FIG. 6. Further facilitating the movement of the canopy out of the way of the roller is the provision of an outwardly projecting flange 57 which provides a smooth surface for engagement of the roller 14 with the canopy as the roller passes in and out of its storage position.

In the alternative form of the invention illustrated by FIGS. 9-11 the principal difference from the embodiment above described resides in the elimination of the slots in the side walls 60 and in the fact that the upper arm portions lie wholly within the canopy when the arms are in elevated position. In order to preserve the feature of employing the torsion spring to hold the canopy firmly against the window frame, the canopy is provided with inwardly directed projections 61 which are L-shaped each having a leg 62 fixed to the canopy side walls 60 and a leg 63 engageable by the upper ends of the arms as at 64. When the arms are in their upper position engaging legs 64, the arms press against legs 64 under the action of the torsion spring placing the awning sheet under tension, and thereby hold the hinged canopy firmly against the window frame.

Awning operator

As indicated above, the pulleys 29 and 30 are preferably positioned below the arm hinge 17—18 a distance approximately equal to the length of the arms 15. This positioning of the pulleys permits the arms 15 to be pivoted downwardly through an angle of approximately 180° so as to provide a substantially complete closure of a window opening. Disposition of the pulleys 29—30 below arm hinges 17—18 however presents a problem of applying sufficient leverage to upper ends of the arms 15 to start the downward movement. The problem is obviated by the positioning of the guide bracket 26 including the locating of the eye 28 through which the pull cord 25 passes. The bracket 26 projects the eye 28 outwardly to provide improved leverage for the lowering of the awning and further disposes the eye 28 in line with the spools 24 so that the cord 25 automatically will be wound properly on the spool when the awning is raised.

FIG. 8 illustrates the leverage advantage provided by the proper disposition of the eye 28. To appreciate the value of bracket 26 and its eye 28 it must be understood that the awning preferably should be wound on the roller by passing over and then under the roller as illustrated in dotted lines in FIG. 5. This disposition of the awning with respect to the roller is of course advisable in order to enhance the appearance of the structure and to permit rain water to run smoothly off the awning. The positioning of the awning in this manner determines the direction in which the cord 25 is wrapped about the spool 24. Thus the cord 25 is required to leave the spool near the window frame rather than on the side remote from the frame. If the bracket 26 were not provided, the cord would leave the spool and pass to the pulleys 29 and 30 as indicated by the broken line 65 in FIG. 8 without imparting any outward component of force to the roller. By providing bracket 26, the downward force of the cord, as indicated by the solid cord line 25, is resolved to provide an outward component of force sufficient to raise the hinged canopy and to permit the roller to be released.

It should be noted too that the cord guides assure proper winding of the cord 25 on the spools 24. Because of the considerable vertical span between pulleys 29 and 30 and the spools 24, such winding would be difficult in the absence of the guides, particularly during windy weather conditions.

While it might possibly be considered desirable to eliminate the spools 24 with their attendant leverage problem and connect the cord directly to the eye 28 it can be demonstrated that the use of the spool greatly facilitates the lowering of the awning and increases the ease by which this operation may be performed.

It should be understood that the guide bracket 26 may take forms other than that shown in the drawings. For example spool covers could be provided, each comprising a plate fixed to the arms 15 and having peripheral flanges substantially surrounding the circumference of each spool 24. Holes provided with nylon gromets formed in the peripheral flange would perform the function of guide brackets and would additionally protect the cord on the spool and keep it from unwinding during certain wind conditions.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. An awning mounted above a window frame comprising, a pair of spaced parallel arms, means at one end of said arms for pivoting said arms to a window frame, a roller rotatably mounted to the other ends of said arms, a canopy projecting outwardly from said window frame for covering said roller when said awning is in raised position, said canopy having a pair of spaced side walls and an outwardly and downwardly projecting wall fixed between said side walls, means for hinging said canopy to said window frame above the location of said roller when pivoted to raised position, an awning sheet connected at one end to said roller and at the other end to said hinge, a torsion spring connected between said roller and said arms to wind said awning on said roller, the forward edge of said canopy lying in the path of said roller when said roller is swung toward and away from said raised position, said canopy being pivotable upwardly on its hinge upon engagement with said roller to permit said roller to pass to and from raised position, and means on said arms engageable with said canopy side walls to hold said canopy in a downward position over said roller when said roller is in raised position.

2. An awning comprising, a pair of spaced parallel arms, means at one end of said arms for pivoting said arms to a window frame, a roller rotatably mounted to the other ends of said arms, a canopy having a main portion passing out and down over said roller for covering said roller when said awning is in raised position, said walls fixed on said main portion, means for hinging said canopy to said window frame above the location of said roller when pivoted to raised position, an awning sheet connected at one end to said roller and at the other end to said hinge, and a torsion spring connected between said roller and said arms to wind said awning on said roller, the forward edge of said canopy lying in the path of said roller when said roller is swung toward and away from said raised position, said canopy being pivotable upwardly on its hinge upon engagement with said roller to permit said roller to pass to and from raised position, side walls having downwardly opening slots through which said arms pass when said roller is swung toward raised position, said arms, when in raised position, engaging the edges of said slots to hold said canopy in a downward position over said roller.

3. An awning comprising, a pair of spaced parallel arms, means at one end of said arms for pivoting said arms to a window frame, said arms having inwardly directed projections at the other ends thereof, a roller rotatably mounted to said projections of said arms and spaced inwardly from said arms, a canopy having a main portion passing out and down over said roller for covering said roller when said awning is in raised position, side walls fixed on said main portion means for hinging said canopy to said window frame above the location of said roller when pivoted to raised position, an awning sheet connected at one end to said roller and at the other end to said hinge, and a torsion spring connected between said roller and said projections to wind said awning on said roller, the forward edge of said canopy lying in the path of said roller when said roller is swung toward and away from said raised position, said canopy being pivotable upwardly on its hinge upon engagement with said roller to permit said roller to pass to and from raised position, said side walls having downwardly opening slots through which said arm projections pass when said roller is swung toward raised position, said projections when said arms are in raised position, engaging the edges of said slots to hold said canopy in a downward position over said roller.

4. An awning comprising, a pair of spaced parallel arms, means at one end of said arms for pivoting said arms to a window frame, a roller rotatably mounted to the other ends of said arms, a canopy for covering said roller when said awning is in raised position, means for hinging said canopy to said window frame above the location of said roller when pivoted to raised position, an awning sheet connected at one end to said roller and at the other end to said hinge, and a torsion spring connected between said roller and said projections to wind said awning on said roller, the forward edge of said canopy lying in the path of said roller when said roller is swung toward and away from said raised position, said canopy being pivotable upwardly on its hinge upon engagement with said roller to permit said roller to pass to and from raised position, and an abutment within said canopy engageable by said roller and arms assembly to hold said canopy in a downward position over said roller when said roller is in raised position.

5. An awning comprising, a pair of spaced parallel arms, means at one end of said arms for pivoting said arms to a window frame, a roller rotatably mounted to the other ends of said arms, a canopy for covering said roller when said awning is in raised position, a hinge member having a C-shape cross-section, means for fixing said hinge member on said frame above the location of said roller when pivoted to raised position, said canopy having a projection extending into said hinge member to form a hinge connection of said canopy to said frame, an awning sheet connected at one end to said roller and having, at the other end, a rod positioned in said C-shape hinge member, said rod clamping said canopy projection within said hinge member and a torsion spring connected between said roller and said projections to wind said awning on said roller, the forward edge of said canopy lying in the path of said roller when said roller is swung toward and away from said raised position, said canopy being pivotable upwardly on its hinge upon engagement with said roller to permit said roller to pass to and from raised position.

6. A window awning comprising, a window frame, a pair of spaced arms each pivoted at one end thereof to said frame intermediate the upper and lower edges of said frame, a roller rotatably mounted on said arms and carrying an awning sheet, said awning sheet being fixed at one end to the top edge of said frame and being of sufficient length to extend from the top to the bottom of said frame, a torsion spring connected between said roller and said arms to cause said roller to wind said awning sheet on said roller, cord spools fixed to said roller at the ends thereof adjacent said arms, a cord guide on each arm adjacent said spool and projecting outwardly from said arm when said roller and arms are in an uppermost position adjacent the upper edge of said frame, pulleys mounted in said frame at a position spaced below said arms a distance approximately equal to the length of said arms, and a pull cord wrapped about said spools and passing through said guides and then passing through said pulleys.

7. A window awning comprising, a window frame, a pair of spaced arms each pivoted at one end thereof to said frame intermediate the upper and lower edges of said frame, a roller rotatably mounted on said arms and carrying an awning sheet, said awning sheet being fixed at one end to the top edge of said frame, a torsion spring connected between said roller and said arms to cause said roller to wind said awning sheet on said roller, cord spools fixed to said roller at the ends thereof adjacent said arms, a cord guide on each arm adjacent said spool and projecting outwardly from said arm when said roller and arms are in an uppermost position adjacent the upper edge of said frame, pulleys mounted in said frame, and a pull cord wrapped about said spools and passing through said guides and then passing through said pulleys.

8. In an awning having an awning sheet fixed at one end to a roller, means for raising and lowering said roller and a canopy for covering said roller when said roller is in raised position, a hinge structure for mounting said canopy to a window frame comprising an elongated extrusion having a C-shaped cross-section, means for fixing said extrusion to said frame with the open portion of said C directed downwardly, said canopy having an upwardly and outwardly directed flange at the upper edge thereof adjacent said frame, said flange projecting into said extrusion at the open portion thereof to form said hinge, and a cross bar fixed to the remaining end of said awning sheet and located within said C-shaped extrusion to fix said awning end to said frame and to clamp said canopy flange within said hinge.

9. In an awning having an awning sheet fixed at one end to a roller, means for raising and lowering said roller and a canopy for covering said roller when said roller is in raised position, a hinge structure for mounting said canopy to a window frame comprising an elongated extrusion having a C-shaped cross-section, means for fixing said extrusion to said frame with the open portion of said C directed downwardly, said canopy having a portion at the upper edge thereof adjacent said frame projecting into said extrusion at the open portion thereof to form said hinge, and a cross bar fixed to the remaining end of said awning sheet and located within said C-shaped extrusion to fix said awning end to said frame and to clamp the projecting portion of said canopy within said hinge.

10. In an awning having an awning sheet fixed at one end to a roller, means for raising and lowering said roller and a canopy for covering said roller when said roller is in raised position, a hinge structure for mounting said canopy to a window frame comprising an elongated extrusion having a C-shaped cross-section, means for fixing said extrusion to said frame with the open portion of said C directed downwardly, said canopy having an upwardly and outwardly directed flange at the upper edge thereof adjacent said frame, said flange projecting into said extrusion at the open portion thereof to form said hinge, and a cross bar fixed to the remaining end of said awning sheet and located within said C-shaped extrusion to fix said awning end to said frame, said cross bar bearing against said canopy projection to secure said projection against undesired movement.

11. An awning comprising, a pair of spaced parallel arms, means at one end of said arms for pivoting said arms to a window frame, a roller rotatably mounted to the other ends of said arms, a canopy having a main portion passing out and down over said roller for covering said roller when said awning is in raised position, means for hinging said canopy to said window frame above the location of said roller when pivoted to raised position, an awning sheet connected at one end to said roller and at the other end to said hinge, and a torsion spring connected between said roller and said arms to wind said awning on said roller, the forward edge of said canopy lying in the path of said roller when said roller is swung toward and away from said raised position, said canopy being pivotable upwardly on its hinge upon engagement with said roller to permit said roller to pass to and from raised position, said side walls each having a downwardly opening slot through which said arms pass when said roller is swung toward raised position, said slot terminating in a notch having a generally horizontal lower edge, said arms, when in raised position, engaging said lower edge to hold said canopy in a downward position over said roller.

References Cited in the file of this patent

UNITED STATES PATENTS

| 608,077 | Powell | July 26, 1898 |
| 758,016 | Mudd | Apr. 19, 1904 |
| 1,917,811 | Richardson | July 11, 1933 |
| 2,568,048 | Arnold | Sept. 18, 1951 |

FOREIGN PATENTS

| 638,043 | Great Britain | May 31, 1950 |
| 520,500 | Canada | Jan. 10, 1956 |

UNITED STATES PATENT OFFICE
CERTIFICATE OF CORRECTION

Patent No. 3,001,577                        September 26, 1961

James A. Anderson

It is hereby certified that error appears in the above numbered patent requiring correction and that the said Letters Patent should read as corrected below.

Column 5, line 56, for "said", third occurrence, read -- side --.

Signed and sealed this 13th day of March 1962.

(SEAL)

Attest:

ERNEST W. SWIDER                              DAVID L. LADD

Attesting Officer                                  Commissioner of Patents